Sept. 4, 1945.　　　　　J. MIGLARESE　　　　　2,384,039

METHOD OF IDENTIFICATION MARKING OF FABRICS

Filed May 11, 1942

Inventor
John Miglarese
by Orwig & Hague
Attys

Patented Sept. 4, 1945

2,384,039

UNITED STATES PATENT OFFICE 2,384,039

METHOD OF IDENTIFICATION MARKING OF FABRICS

John Miglarese, Cincinnati, Ohio, assignor to The National Marking Machine Company, Cincinnati, Ohio, a corporation of Ohio Application May 11, 1942, Serial No. 442,545

6 Claims. (Cl. 41—33)

At the present time it is the custom of manufacturers of textile fabrics, blankets and garments such as overalls, etc., to apply permanent identifying marks thereto by the use of metal tabs mechanically secured to the garments or fabrics by labels sewed thereto.

Attempts have been made to apply identification marks by means of paints applied through a stencil and by ink applied by type. These marks have not been satisfactory at least on many kinds of fabrics because they have not been permanent enough, hence, said metal or fabric labels are used.

The object of my invention is to provide a simple and inexpensive method for quickly and easily affixing to a fabric an identification mark of a permanent character, applied and affixed to the fabric without the use of metal or fabric labels.

Figure 1:
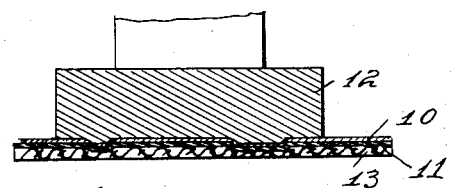
Figure 1 shows an enlarged vertical sectional view of a fabric to be marked, a Cellophane and rubber sheet thereon, and a heated type pressed against the sheet forcing the portions of the sheet engaged by the type faces into the fabric.
Figure 2:
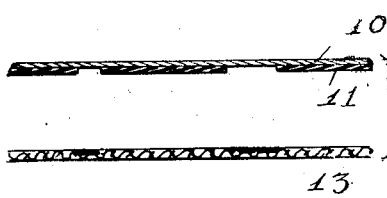
Figure 2 shows a sectional view of a fabric having a rubber mark affixed thereto and the Cellophane and rubber sheet elevated above it, showing the sheet after removal of the marked portion.
Figure 3:
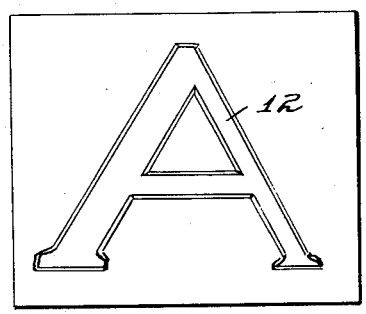
Figure 3 shows a face view of the type.

The apparatus used in my method comprises a thin sheet of flexible material, such as Cellophane or paper, indicated by the numeral 10, and to which is affixed on one side a layer of rubber 11, preferably about one one-hundredths of an inch in thickness.

The type for printing the mark are shown at 12, the fabric to be marked is indicated as 13.

In the practice of my method I place the sheet 10 and 11 on the fabric 13, with the rubber against the fabric. I then press the heated type against the sheet and hold it in position until the rubber has melted at the points immediately adjacent the faces of the type. The pressure against the type will force said portions deep into the fabric and vulcanize it thereto, while the remainder of the sheet to which no pressure is applied will rest on top of the surface of the fabric. This causes a separation of the rubber that is pressed into the fabric from the rubber above the fabric. When the type is removed, it is found that the rubber that had been pressed into the fabric has become vulcanized to the fabric and deeply embedded therein and, hence, permanently affixed with its smooth outer surface exposed.

When this has been done, the operator grasps the Cellophane sheet and removes it from the fabric, and if any of the melted rubber should adhere to the rubber sheet it is easily torn apart upon the removal of the sheet.

The rubber is colored to contrast with the color of the fabric and be clearly visible.

Instead of the layer 11 of rubber, I may use a layer of any of the known synthetic rubbers or rubber substitutes and wherever, in the specification or claims, I have used the word "rubber" I mean rubber or any known synthetic rubber or rubber substitute that is the equivalent of natural rubber.

For the Cellophane sheet I may use various kinds of paper or other material of a flexible nature, or the rubber sheet only may be used.

In practice I have demonstrated that an identification mark applied to a fabric by the foregoing method will withstand the severe kind of laundering to which greasy overalls are subjected and the kier boiling and heavy blocking to which fabrics are subjected prior to dyeing processes, and other severe cleaning operations.

In practice I have demonstrated that type heated to the degree necessary to melt the rubber does not affect the sheet of Cellophane or paper.

I claim as my invention:

1. The method of applying permanent identification marks to fabrics, which consists in placing a thin sheet of rubber upon a fabric to be marked, heating a type to the degree necessary to melt the rubber immediately adjacent the type face, pressing the type against the rubber sheet until said melting occurs, removing the type, and finally removing the unmelted portion of the sheet.

2. The method of applying permanent identification marks to fabrics, which consists in placing upon a fabric to be marked a thin sheet of flexible and vulcanizable material characterized by being melted upon the application of heat, heating a type to the degree necessary to melt the flexible sheet immediately adjacent the type face, pressing the type against the flexible sheet until said melting occurs, removing the type and finally removing the remainder of the flexible sheet.

3. The method of applying permanent identification marks to fabrics, which consists in providing a sheet of tough, flexible material and a thin sheet of rubber adhering to one surface thereof, placing same upon a fabric to be marked with the rubber, against the fabric, heating a type to the degree necessary to melt the rubber immediately adjacent the type face, pressing the type against said sheet until said melting occurs, removing the type, and finally removing the remainder of the sheet.

4. The method of applying permanent identification marks to fabrics, which consists in placing a thin sheet of rubber upon a fabric to be marked, heating a type to the degree necessary to melt the rubber immediately adjacent the type face, pressing the type against the rubber sheet and thereby forcing the portions of the rubber engaged by the type face deeply into the fabric, with the body of the rubber sheet held by the fabric above the surface of the fabric, applying heat to the type in an amount to melt the rubber and to cause a separation of the melted rubber from the body of the sheet due to its depression into the fabric, removing the type and finally removing the remainder of the rubber sheet.

5. The method of applying permanent identification marks to fabrics consisting of applying a thin sheet of rubber to the fabric to be marked, applying to said sheet heat and pressure localized in the form of the mark to be applied, whereby portions of the rubber sheet corresponding to the mark are embedded in and vulcanized to said fabric, and then removing the remaining portion of said sheet.

6. The method of applying permanent identification marks to fabrics consisting of applying to the fabric to be marked a backing sheet having a thin layer of rubber thereon, applying to said backing sheet heat and pressure localized in the form of the mark to be applied, whereby portions of the rubber layer corresponding in form to the mark are embedded in and vulcanized to the fabric, and then removing the backing sheet and the remaining portions of said rubber layer.

JOHN MIGLARESE.